United States Patent [19]

Kugelmann

[11] Patent Number: 4,888,073
[45] Date of Patent: Dec. 19, 1989

[54] EVACUATED INSULATION AND A METHOD OF MANUFACTURING SAME

[75] Inventor: Franz J. Kugelmann, Juneau, Ak.

[73] Assignee: Nudvuck Enterprises, Juneau, Ak.

[21] Appl. No.: 295,580

[22] Filed: Jan. 9, 1989

Related U.S. Application Data

[62] Division of Ser. No. 137,964, Dec. 23, 1987, Pat. No. 4,837,388.

[51] Int. Cl.$^4$ .............................................. B32B 31/14
[52] U.S. Cl. .................................... 156/197; 156/210; 156/217; 156/221; 156/256
[58] Field of Search ............... 156/210, 197, 217, 221, 156/256

[56] References Cited

U.S. PATENT DOCUMENTS 3,936,553  2/1976  Rowe ..................................... 428/81
4,401,706  8/1983  Sovilla ................................. 428/158
4,579,756  4/1986  Edgel .................................... 428/34

Primary Examiner—Alexander S. Thomas
Attorney, Agent, or Firm—Graybeal, Jensen & Puntigam

[57] ABSTRACT

An article of insulation and its method of manufacture, in which a planar sheet member has a plurality of score lines (24—24) made in the exterior surface thereof, and is then folded along the score lines (24—24) and then sealed to form an enclosed, airtight volume. Positioned between the upper and lower portions (12,14) of the sheet member are a plurality of thin, flexible, resilient, spaced interior elements (36—36). The combination is deformed to form corrugated surfaces and then expanded so that the upper and lower portions are spaced apart and the interior elements are again substantially flat. The space between the upper and lower elements is evacuated.

5 Claims, 3 Drawing Sheets

EVACUATED INSULATION AND A METHOD OF MANUFACTURING SAME

This is a division of application Ser. No. 137,964 filed on Dec. 23, 1987 now U.S. Pat. No. 4,837,388.

DESCRIPTION

1. Technical Field

This invention relates generally to the insulation art and more particularly concerns an evacuated article of insulation and a method for manufacturing the same.

2. Background Art

It is well known that an evacuated article or element, i.e. an article which has substantially all of the air removed from its interior volume, is desirable for use as insulation, because convection heat loss for such an article is almost zero. Other desirable characteristics of insulation in general include low conduction heat and low radiation heat loss. Reduction of conduction heat loss is typically accomplished by decreasing the material to material contact to an amount which is just sufficient to maintain structural integrity of the article, while radiation heat loss is typically minimized by the use of interior reflective surfaces.

While evacuated insulation typically has good convection heat transfer characteristics, i.e. low convection heat loss, it is also typically quite expensive and relatively slow and difficult to manufacture. Further, the amount of internal material contact is often an issue with such insulation, because of the resulting increase in conductive heat loss, because substantial internal support is necessary to maintain the structural integrity of the evacuated article against the differential of the internal and external pressure. U.S. Pat. No. 3,936,553 to Rowe is illustrative of evacuated insulation which includes a plurality of transverse support pins within the interior volume of the article and insulating material at the edges of the article to maintain the integrity of the insulation. Such insulation is, however, expensive to manufacture, and thus not extensively used.

The present invention is directed toward a article of insulation, as well as a corresponding method for manufacturing such an article, which is evacuated and thus has all of the advantages of evacuated insulation, but which is relatively inexpensive to manufacture and which also has a relatively low conduction and radiation heat loss.

DISCLOSURE OF THE INVENTION

Accordingly, the present invention is an insulation article, and the corresponding method for making it, which includes upper and lower outer elements which are spaced apart and joined around the periphery thereof and sealed to define an airtight interior volume. The outer elements each have a surface configuration of successive peaks and valleys, corrugated in the particular embodiment described. The interior volume is substantially evacuated. The article includes at least one relatively thin, substantially flat, resilient interior member which is secured to successive portions of both the upper and lower outer elements closely adjacent the interior element.

BEST MODE FOR CARRYING OUT THE INVENTION

Figure 1:
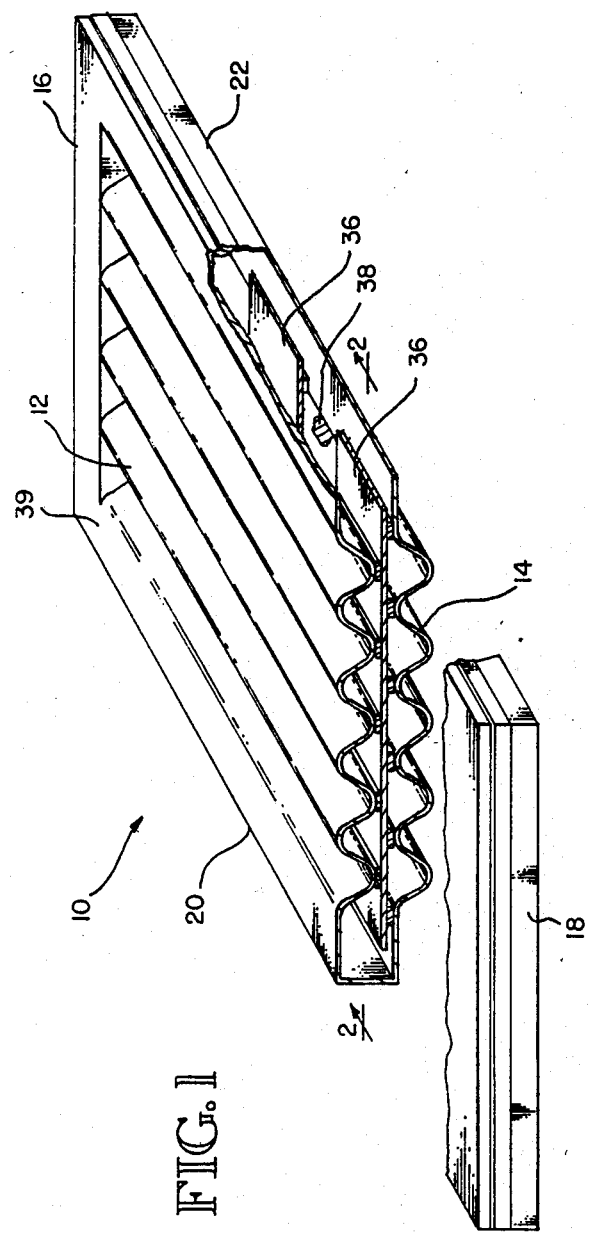
FIG. 1 is an isometric view of the article of insulation of the present invention.
Figure 2:
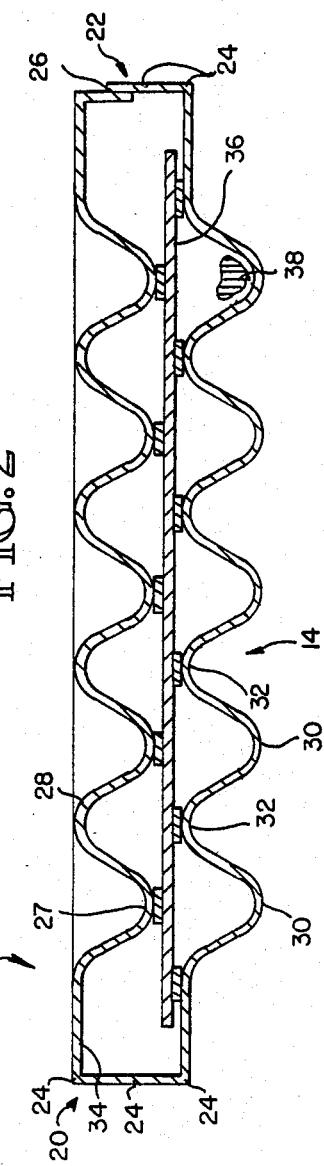
FIG. 2 is a cross-sectional view taken along lines 2—2 in FIG. 1.

FIGS. 1 and 2 show the completed article of insulation of the present invention, while FIGS. 3–7 show successive steps in the manufacture of the article.

Referring now specifically to FIGS. 1 and 2, the article of insulation of the present invention, shown generally at 10, includes two opposing outer sheet-like members 12 and 14 as well as end surfaces 16 and 18 and side surfaces 20 and 22. Typically, but not necessarily, the end and side surfaces are a continuation of the outer member 12 and 14. The outer members 12, 14, as well as the end surfaces 16, 18 and side surfaces 20, 22 are made from an air impervious and relatively rigid, but deformable, plastic or thin metal.

Score lines 24—24 (FIG. 2) are provided at specific locations in the sheet member(s) shown, in order to weaken the sheet material so that sheet member(s) can be readily formed into a three-dimensional element, as will be discussed in more detail hereinafter. Any seams which result, such as what might occur at 26, are joined together in an airtight manner. The interior of the article 10 is substantially evacuated, i.e. free of air, following completion of the manufacturing process, as described in detail below.

In the embodiment shown, the outer members 12 and 14 are formed from a single continuous sheet as described hereinafter, and are corrugated in one direction with the corrugations extending from one end 16 to the opposing end 18. Outer member 12 has adjacent successive valleys and peaks 27 and 28, while outer member 14 has alternating successive peaks and valleys 30 and 32, i.e. the valleys 27—27 of outer member 12 are in registry with the peaks 30—30 of outer member 14, and peaks 28—28 of outer member 12 are in registry with valleys 32—32 of outer member 14. The terms valley and peaks are used relative to the center of the article, i.e. the valleys of each outer member are relatively toward the center of the article and the peaks viceversa. The interior surface 34 of the finished article is either polished, if the members are metal, or has a reflective coating thereon, for the purpose of preventing radiative heat loss.

Although the embodiment shown in FIGS. 1 and 2 has a corrugated form, it should be understood that the article may have other configurations.

Extending laterally across the article, i.e. from side 20 to side 22 thereof, are a plurality of interior elements 36—36. Positioned between the spaced interior elements 36—36 is a material referred to as a gettering agent 38 which is known in the art for the purpose of residual gas absorption. The process of achieving the evacuation of the article is explained in more detail below. In the embodiment shown, the interior elements 36 are made from a flexible material having a low outgasing rate, and relatively high structural strength. The interior surface of the valleys 27—27 of outer member 12 and the interior surface of the valleys 32—32 of outer member 14 are secured to opposed surfaces of the interior elements 36—36, by means of an adhesive or similar bonding agent. The interior elements 36—36 provide the interior structural integrity necessary for the finished article.

The interior elements 36—36 in the embodiment shown do not extend completely from side-to-side but terminate a relatively small distance from each side 20 and 22. However, they do extend, as shown in FIG. 2, completely across the corrugated portions. It should be understood that the interior elements 36—36, being flexible, are inherently relatively poor conductors of heat and thereby heat transfer across the article by conduction is minimized.

It should also be understood that the article of insulation of FIGS. 1 and 2 can be manufactured to various sizes, depending upon the desired application.

A typical size, however, is 8 ft. by 16½ inches by 2 inches thick for use between adjacent studs of a cold storage building. Typically, there will be a border 39 around the article 10 which is not corrugated. Typically, however, the border 39 forms a relatively small part of the total surface area of the article. In the embodiment shown, the outer members 12, 14 are relatively thin, approximately 0.042 inches thick, while the interior members 36—36 are also thin, approximately 0.062 inches thick. In the embodiment shown, the interior elements 36—36 are approximately 14 inches long by 2 inches wide, with 1 inch of space between adjacent interior elements.

As indicated briefly above, the differential pressure in an evacuated article of insulation is important as there must be sufficient interior structure to prevent the article from collapsing. The differential pressure is accommodated by three structural features of the article shown, specifically, by the combination of side surfaces 20, 22 and end surfaces 16, 18, by the relatively rigid nature of the outer elements 12 and 14 and the additional stiffness produced by deformation of the elements, i.e. corrugation, and lastly by the flexible interior elements 36—36 which bridge adjacent corrugations of outer members 12 and 14.

FIGS. 3-7 show the sequence of steps in the method of manufacture of the present invention. The method described herein is distinguished from the common method of evacuation of such an article, which typically includes the use of a pump to remove the gases occupying the interior space of the article. Following such an evacuation, any residual gases are typically absorbed by a conventional gettering material, such as ceto powder. As pointed out above, such a common method is relatively slow, as well as expensive.

Figure 3:
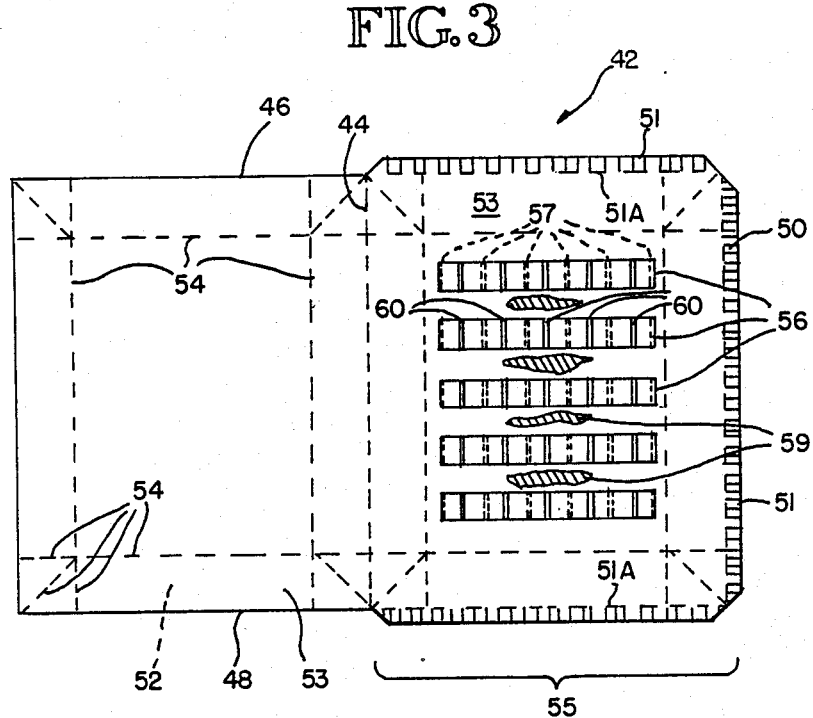
FIG. 3 is a top plan view showing an initial step in the method of manufacture of the article shown in FIGS. 1 and 2.

FIG. 3 shows a sheet of material 42 from which the article of insulation will be formed. Sheet 2 is basically twice the outline size of the article of insulation, since sheet 42 will, in the steps of the method of manufacture described herein, be folded back upon itself along central score line 44 which extends between side edges 46 and 48. Extending approximately along one-half of side edges 46 and 48 respectively, and along end edge 50 is a narrow border portion 51 which is approximately 0.18 inches wide in the embodiment shown. The border portion 51 is used to help seal the article after it has been folded along line 44, as will be explained in greater detail hereinafter.

In the embodiment shown, element 42 comprises a relatively thin (approximately 0.042 inches thick), flat, portion of rigid, deformable material such as plastic or metal as previously described. A specific example is 19 gauge sheet steel. In addition to score line 44, other score lines 54—54 are provided in the lower surface 52 of the sheet 42, oriented as shown in FIG. 3. The numeral 54 refers to all of the score lines, shown as dotted lines in FIG. 3, in the embodiment shown. As explained above, the score lines 54—54 facilitate bending/folding of portions of the element along selected lines to form a three dimensional article.

Positioned on the upper surface 53 of one-half 55 of sheet 42 are a plurality of interior strip-like elements 56—56. The interior elements are relatively thin (approximately 0.062 inches in the embodiment shown) and comprise flexible elastomeric material, such as rubber or polyurethane. The interior elements 56—56 are secured to the upper surface 53 of sheet 42 by means of a suitable adhesive, along spaced apart lines 57 which extend from side to side of each element. In the embodiment shown, there are five such interior elements, each one 14 inches long by 2 inches wide, separated by a space of 1 inch, for use in an article of insulation having final outline dimensions of 16 inches by 16 inches by 2 inches thick. It should be understood that other dimensions and other configurations can be used. On the upper surface of interior elements 56—56 are spaced lines of adhesive 60—60 which are positioned between adhesive lines 57—57 on the lower surface of elements 56—56. Gettering material 59 is positioned between adjacent interior elements 56—56.

Figure 4:
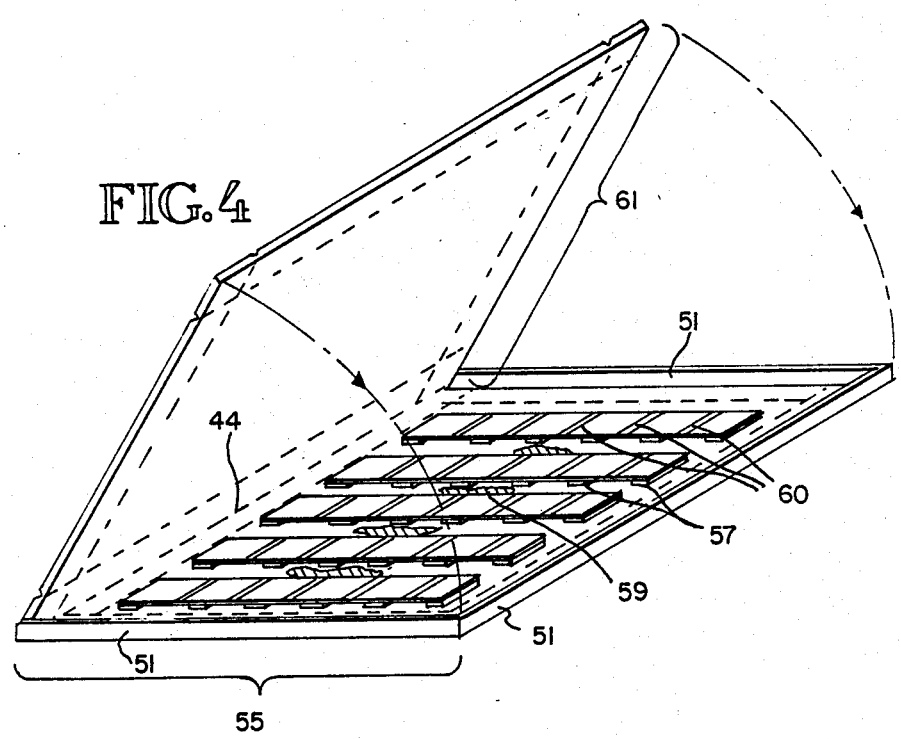
FIGS. 4–7 show successive steps in the method of manufacture of the article of FIGS. 1 and 2.

Referring now to FIG. 4, sheet 42 is first folded along score line 44, so that the other half 61 of element 42 is positioned directly on top of the one half 55 thereof, which is now in effect the lower half of the article, separated by interior elements 56—56, which are now secured to both the upper half 61 and the lower half 55 of sheet 42, by virtue of the lines of adhesive 60 57, respectively.

The border 51 along side edges 46, 48 and end edge 50 around lower half 55 of the sheet 42 is then folded up along its adjacent score line 51A and typically overlaps the adjacent edges of the upper half 61 of sheet 42.

Figure 5:
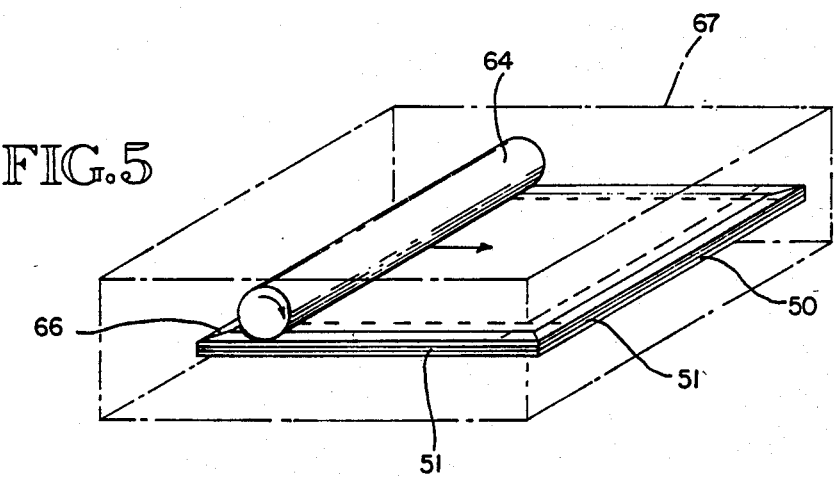

FIG. 5 illustrates the step in which most of the interior trapped gases are removed and the border is folded about the edges of the upper half of sheet 42. This is accomplished by a heavy roller 64 which is positioned on the upper surface of the upper half 61 of sheet member 42. Downward pressure is applied by the roller 64 and it is moved from one end edge 66 of the article to the opposing end edge 50, as illustrated in FIG. 5. This step of pressure rolling removes most of the trapped residual interior gases in the article. The border 51 is typically sealed against the adjacent edges of the upper half 61 of sheet 42 by means of a bonding material/agent which is applied prior to the pressure rolling step or by welding or brazing following the pressure step. A greater amount of gas can be removed if the pressure formation step is accomplished in an evacuated work space such as shown by the dotted/dashed lines 67 in FIG. 5.

Figure 6:
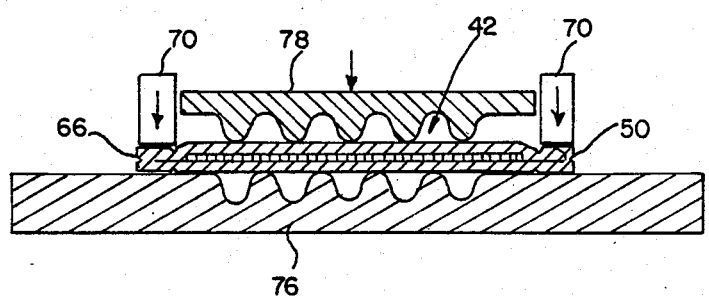

At this point, the article is now completely compressed and is ready to be expanded, in which the upper and lower halves 55, 61 are deformed and then drawn away from each other, leaving an interior space between them in which there exists a vacuum. FIG. 6 shows this next step in the method of manufacturing the article of the present invention. Hold down rams 70—70 are positioned above the upper surface of the folded sheet 42, along end edges 66 and 50. The folded sheet 42 is positioned between lower and upper mold elements 76 and 78 in the embodiment shown, which have a mating corrugated surface configuration. Lower mold element 76 is stationary, while upper mold element 78 moves vertically against the folded sheet 42, referred to hereinafter as article 42, to deform it. It should be understood that the mold elements 76, 78 may have surface configurations other than corrugated. First, downward pressure is applied by the hold down rams 70—70 against the article 42a, tending to hold the article in place on the lower mold 76. Upper mold 78 is then moved downwardly with considerable force, sufficient to form the article 42 into a corrugated shape.

Figure 7:
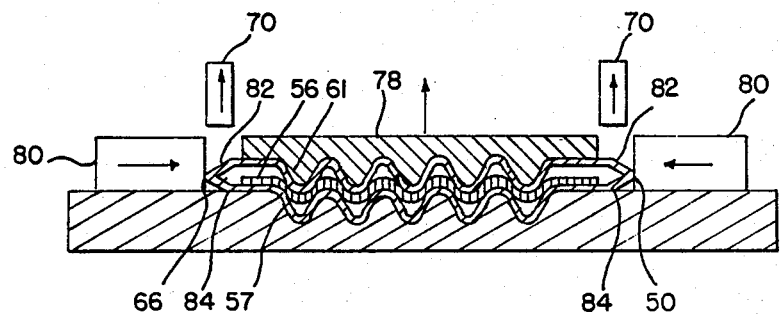

FIG. 7 illustrates the final step in the process, in which the pressure from the upper mold 78 is released, as well as pressure from the hold down rams 70—70. First, the hold down rams 70—70 are removed. Then the upper mold 78 is released and simultaneously, side forming rams 80—80 are moved in. The interior elements 56—56 attempt to resume their normal flat shape, due to the resilience of the material, which tends to result in the upper and lower halves 61, 57 moving vertically apart from each other, as shown in FIG. 7. The action of the side forming rams 80—80 against the edges 66, 50 of the article, resulting in pressure directly laterally inwardly of the article, causes further separation of the upper and lower halves of the article, forming flat, vertical end surfaces at the conclusion of the process, because of the score lines 82, 84. In the embodiment shown, these end surfaces are 1.1 inches high, but this could be varied. The side forming rams 80—80 are then withdrawn and the article is complete, as shown most clearly in FIG. 2.

Although a preferred embodiment of the invention has been disclosed herein for purposes of illustration, it should be understood that various changes, modifications and substitutions may be incorporated in such embodiment without departing from the spirit of the invention, as defined by the claims which follow.

I claim:

1. A method for manufacturing an insulation article, comprising the steps of:

positioning an elongated interior element which is flat and relatively thin and comprised of a flexible, resilient material, on the upper surface of one half of a sheet member having adjacent halves which define upper, and lower portions of the completed article, the sheet member comprised of a rigid but deformable material;

securing the interior element to said one half of the sheet member at spaced points along the lower surface of the interior element;

folding the other half of the sheet member, which defines the upper portion of the insulation article, on top of the one half thereof, which defines the lower portion of the insulation article;

securing, the interior element to the other half of the sheet member at spaced points along the upper surface of the interior element;

applying pressure to the top surface of the upper portion of the insulation article so as to force out substantially all of the gas between the upper and lower portions thereof;

sealing the periphery of the upper and lower portions so as to form an air-tight article of insulation;

deforming the combination of the upper and lower portions and the interior element so that the combination thereof is formed into a series of successive peaks and valleys;

expanding the upper and lower portions away from each other such that the interior element is substantially flat and the upper and lower portions are spaced apart from each other, wherein the interior space between the upper and lower portions is substantially completely evacuated.

2. A method of claim 1, wherein the upper and lower portions are deformed into a corrugated surface configuration, respectively, wherein the corrugated surfaces of the upper and lower portions are in registry, and wherein the interior element is secured to the upper and lower portions at successive adjacent locations.

3. A method of claim 1, wherein the one half of the sheet member includes a border portion around the edge thereof and wherein the step of folding includes the step of folding the border portion about the edge of the other half of the sheet member.

4. A method of claim 1, including the step of making score lines on the exposed surface of the sheet member where the sheet-like member is to be folded, so as to facilitate formation of the article.

5. A method of claim 4, wherein the step of expanding includes the step of applying pressure laterally inwardly of the article along the opposed edges thereof, so as to create vertical sides for the article, defined by said score lines.

* * * * *